Figure 1:
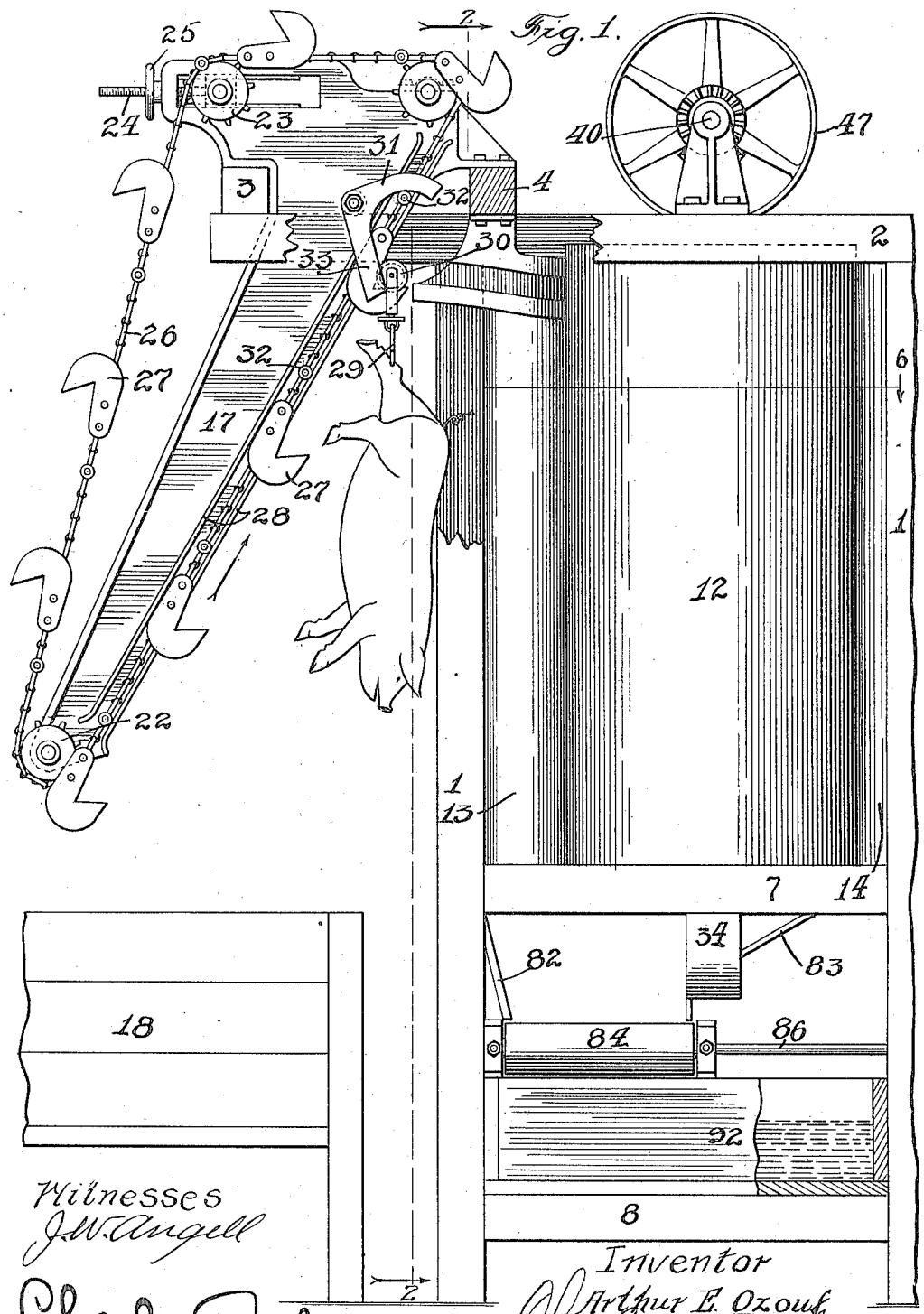

A. E. OZOUF.
HOG DEHAIRING MACHINE.
APPLICATION FILED JUNE 3, 1915.

1,180,874.

Patented Apr. 25, 1916.
4 SHEETS—SHEET 1.

Witnesses
J. W. Angell
Charles W. Hill Jr.

Inventor
Arthur E. Ozouf,
by Charles W. Hill Atty.

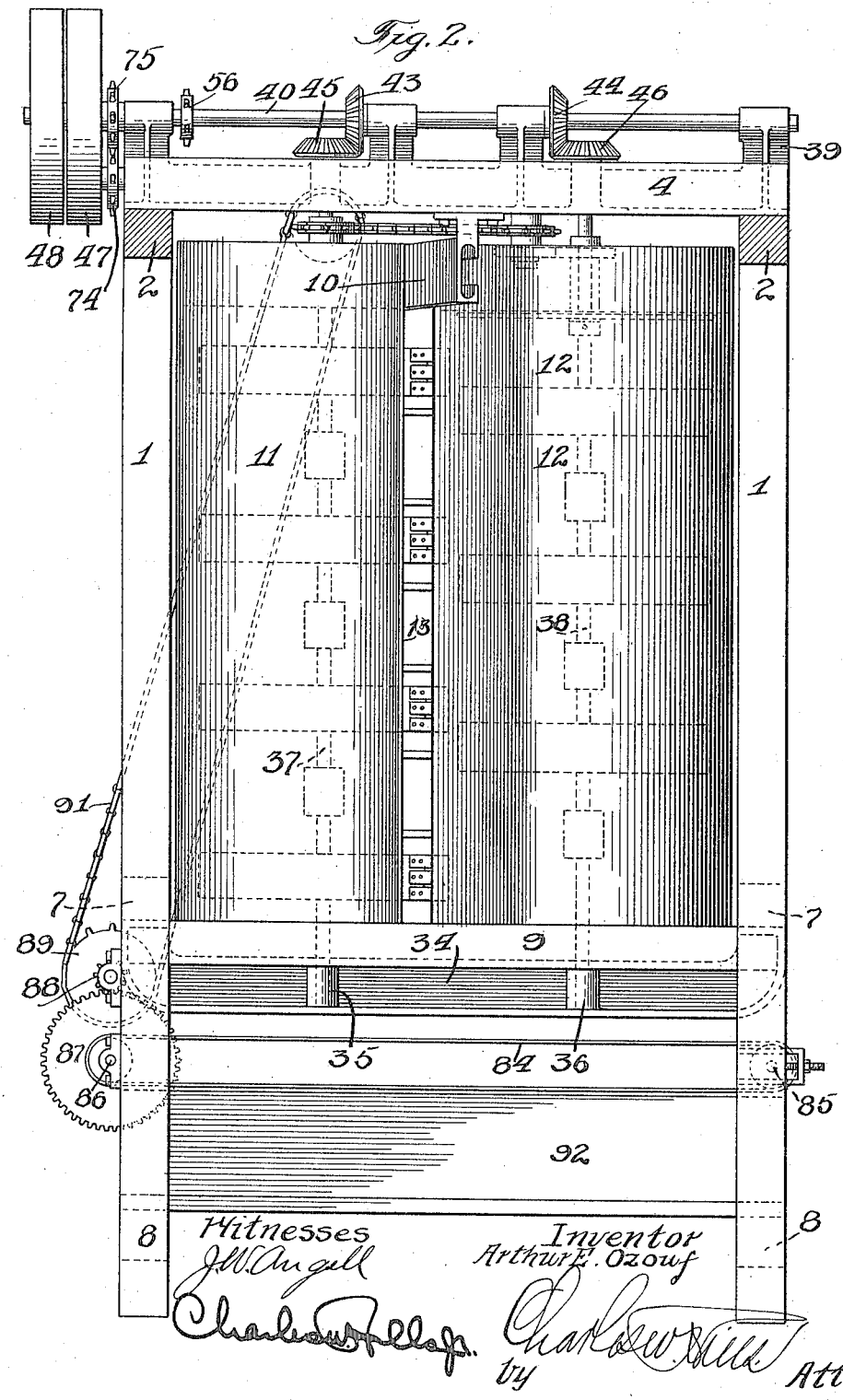

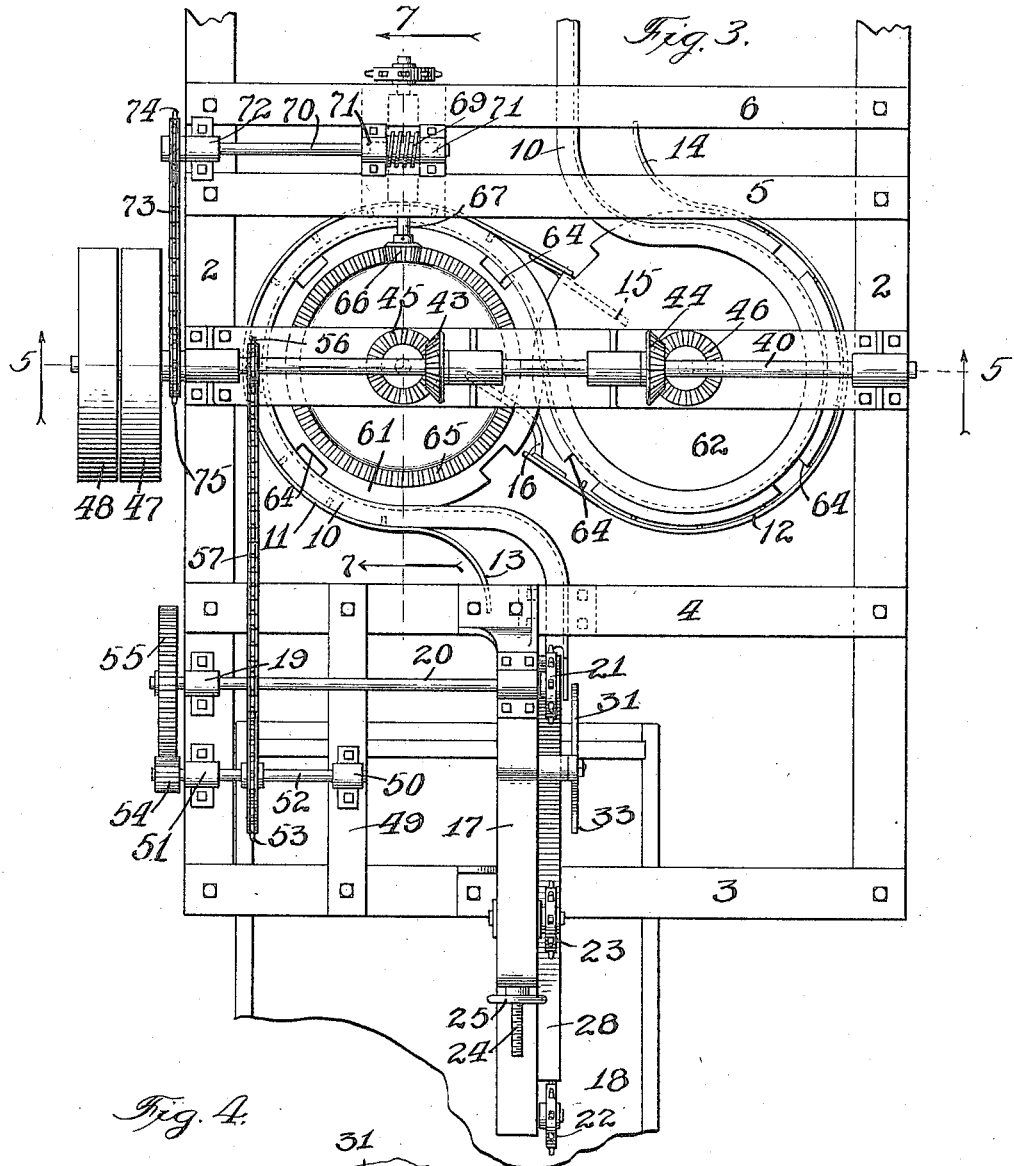

A. E. OZOUF.
HOG DEHAIRING MACHINE.
APPLICATION FILED JUNE 3, 1915.
1,180,874.
Patented Apr. 25, 1916.
4 SHEETS—SHEET 4.
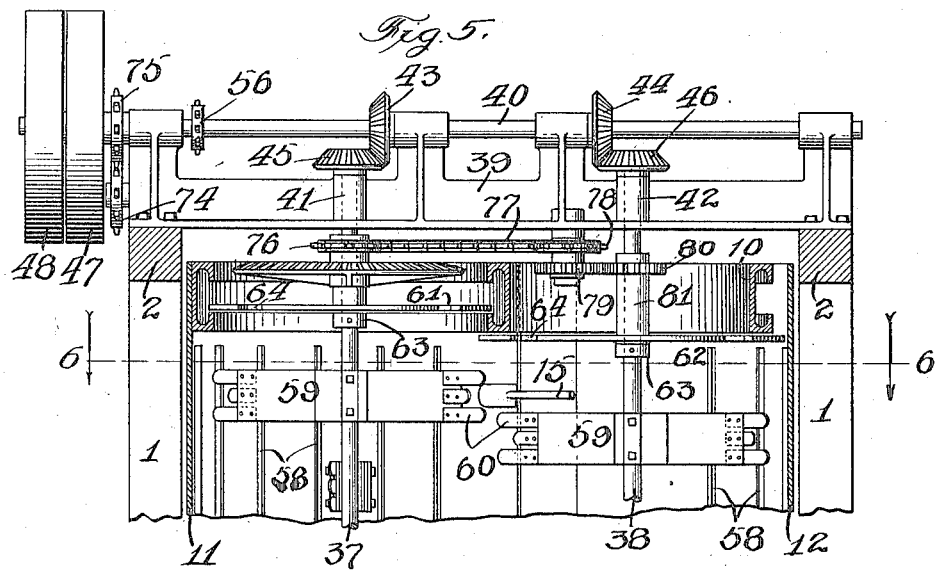
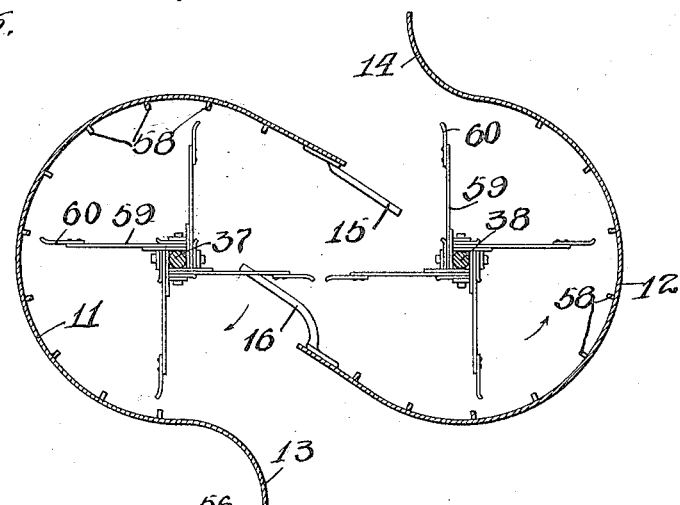
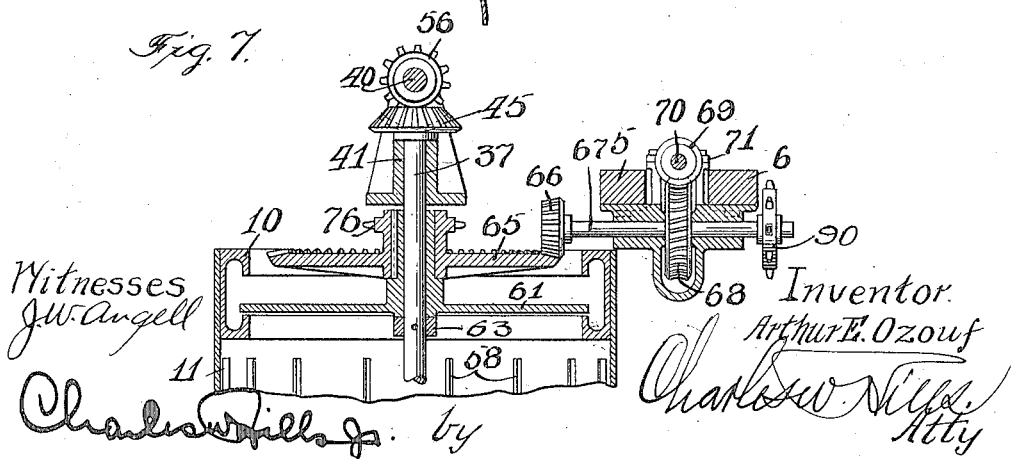
Witnesses
J. W. Angell
Charles Hill Jr.
Inventor
Arthur E. Ozouf
Charles W. Hill
Atty
by

UNITED STATES PATENT OFFICE.

ARTHUR E. OZOUF, OF CHICAGO, ILLINOIS, ASSIGNOR TO THE ALLBRIGHT-NELL CO., OF CHICAGO, ILLINOIS, A CORPORATION OF ILLINOIS.

HOG-DEHAIRING MACHINE.

1,180,874.  Specification of Letters Patent.  Patented Apr. 25, 1916.

Application filed June 3, 1915. Serial No. 31,827.

*To all whom it may concern:*

Be it known that I, ARTHUR E. OZOUF, a citizen of the United States, and a resident of the city of Chicago, in the county of Cook and State of Illinois, have invented certain new and useful Improvements in Hog-Dehairing Machines; and I do hereby declare that the following is a full, clear, and exact description of the same, reference being had to the accompanying drawings, and to the numerals of reference marked thereon, which form a part of this specification.

This invention relates to an improved type of hog dehairing machine wherein the hog is elevated upon a suitable conveyer chain from a scalding tank and transferred to a track suspended by a gambrel chain for movement on said track through cylindrical members having revolving beaters therein which serve to rotate and remove the hair from the carcass as it passes therethrough.

It is an object therefore of this invention to construct a dehairing machine comprising cylinders having stationary scraper bars on the inner walls thereof with revolving beaters mounted axially therein acting to rotate and dehair a carcass carried around in contact with the walls of the cylinders to a point of discharge.

It is also an object of this invention to construct a carcass dehairing mechanism embracing upright cylinders having revoluble beaters mounted therein and a track to receive a roller having attached thereto a gambrel chain from which a carcass is suspended, whereby the carcass may move through said respective cylinders from one to another in the field of operation of the beaters for removal of the hair from the carcass.

It is also an object of this invention to construct a dehairing mechanism comprising an elevating chain to receive attached thereto a gambrel hook from which a carcass is suspended, said chain elevating the carcass to a track which is disposed in a tortuous path adjacent beater mechanisms, and with means operated by said elevating chain to disengage the gambrel hook therefrom and transfer the same to said track to carry the carcass through the field of operation of the beaters.

It is also an object of this invention to construct a dehairing mechanism comprising upright cylindrical members having beaters rotatable therein with a track disposed in said cylinders adapted to receive the roller of a gambrel chain from which a carcass is suspended, and with mechanisms in each of said cylindrical members for engaging the gambrel chain to move the roller on the track and the carcass therewith through the respective cylinders in the field of operation of the beaters.

It is furthermore an important object of this invention to construct a carcass dehairing mechanism embracing an elevating chain adapted to receive gambrel chains attached thereon to remove carcasses from a scalding tank to a track which passes through various upright members having shafts therein with beaters thereon, to permit the rollers on the gambrel chains to move in said track, and carry carcasses therewith through said members in the field of operation of the beaters, with mechanisms to insure positive movement of the gambrel rollers on said track, and with operative connections between the beaters, said mechanisms, and the elevating chains to insure simultaneous operation of all the parts.

It is finally an object of this invention to construct a simple type of hog dehairing machine acting efficiently to dehair carcasses passed therethrough.

The invention (in a preferred form) is illustrated in the drawings, and hereinafter more fully described.

In the drawings: Figure 1 is a side elevation partly broken away of a machine embodying the principles of my invention. Fig. 2 is a section taken on line 2—2 of Fig. 1. Fig. 3 is a top plan view of the machine, with parts shown fragmentarily. Fig. 4 is a fragmentary detail of a detaching mechanism to transfer a carcass from the elevating chain to a track mounted adjacent to the field of operation of the beaters. Fig. 5 is a fragmentary sectional view with parts shown in elevation taken on line 5—5 of Fig. 3. Fig. 6 is a detail section taken on line 6—6 of Fig. 1, with parts omitted, and parts shown in elevation. Fig. 7 is a fragmentary section taken on line 7—7 of Fig. 3.

As shown in the drawings: The machine comprises a built-up structure embracing upright timbers 1, connected at their upper ends by longitudinal timbers 2, and with a plurality of transverse or cross beams 3, 4, 5 and 6, bolted thereto. Longitudinally extending timbers 7 and 8, are bolted between the uprights 1, at the lower end of the frame as shown in Fig. 1, and in dotted lines in Fig. 2, to reinforce and strengthen the same. Said frame structure is further provided with horizontal cross beams 9, at the lower portion thereof beneath the upper cross beams 4 and 5, respectively. Supported beneath the respective upper cross timbers 4, 5, and 6, in any suitable manner, is an S-shaped track 10, which, as shown in detail in Fig. 7, is of channel section with the entrance end of said track, as shown in Figs. 1 and 4, inclined, and with the upper flange of the channel cut away at the entrance end thereof. Rigidly secured to said track 10, in any suitable manner are upright vertical cylindrical elements 11 and 12, which as clearly shown in Fig. 6, are somewhat of a U-shape, with the open sides thereof directed toward one another and with the side wall of one of said elements at the entrance end of the track 10, curved outwardly as denoted by the reference numeral 13, and the corresponding side wall of the other of said elements at the exit end of the track curved outwardly as denoted by the reference numeral 14. Said track 10, thus serves to support said cylindrical element, although the respective outwardly curved ends 13 and 14, thereof may rest upon the lower cross beam members 9, to assist in sustaining the weight thereof. Guide or bracket arms 15 and 16, respectively, are secured along the edge of the respective cylindrical elements 11 and 12, to guide the carcass in its movement from one of said elements into the other, as clearly shown in Fig. 6.

Bolted and supported upon the cross beams 3 and 4, is a large casing or frame member 17, which projects downwardly at an incline from the frame structure to a point above a scalding tank 18. Journaled in a suitable bearing provided in said frame member 17, and in a bearing 19, mounted upon the longitudinal horizontal beam 2, is a shaft 20, provided on its end adjacent said frame member with a sprocket wheel 21. Another sprocket wheel 22, is journaled at the lower end of said frame member 17, and another sprocket wheel 23, is journaled in a traveling carriage or bearing, adjustable by means of a lead screw 24 and hand wheel 25, to afford a take-up means at the upper end of said frame member 17. Trained about said respective sprocket wheels 21, 22 and 23, is a carrier or elevating chain 26, with relatively large hooks 27, secured thereon, and with the inner or upwardly moving run of said chain moving between guides 28, provided on said frame member 17. The carcasses to be operated upon are taken from the scalding tank 18, and attached to the leg of each thereof for the purpose, is a gambrel hook or chain 29, provided with a roller 30, which is adapted to be hooked over one of the hooks 27, as shown in Fig. 1, so that the carcass is elevated from the scalding tank 18, by said chain 26.

Mechanism is provided acting automatically to move the rollers 30, out of engagement with the hooks 27, and onto the track 10, and for this purpose a bell crank is journaled on a horizontal stud on said frame member 17, as shown in Figs. 1 and 4, the upper curved arm 31, of which is adapted to be contacted by rollers 32, provided on the chain 26, in advance of the hooks 27, thus acting to throw said arm 31, upwardly and move the other arm 33, inwardly to thrust the roller off the hook 27, and onto the track 10. A frame member 34, extends beneath the respective cylindrical elements 11 and 12, as shown in Figs. 1 and 2, and is supported at its ends in any suitable manner from the beams 7, and affords bearings 35 and 36, for vertical shafts 37 and 38, respectively, extending upwardly through the cylindrical elements. An integral frame member 39, extends transversely across the horizontal beams 2, and journaled therein horizontally across the frame of the structure, is a shaft 40. Said frame member 39, is also provided with vertical bearings 41 and 42, respectively, for the upper ends of said shafts 37 and 38. Rigidly secured upon said transverse shaft 40, are bevel pinions 43 and 44, respectively, which mesh with the respective bevel pinions 45 and 46, secured upon said shafts 37 and 38, to drive said latter shafts from said transverse shaft 40. Tight and loose pulleys 47 and 48, respectively, are secured upon the outer ends of said transverse shaft 40, to permit a drive to be imparted thereto by a belt or any other suitable means if so desired.

As shown in Fig. 3, a short beam 49, extends between the cross beams 3 and 4, and secured thereon is a bearing 50, which, together with a bearing 51, secured on one of the horizontal beams 2, affords support for a shaft 52, provided with a sprocket wheel 53. Secured on the outer end of said shaft 52, is a pinion 54, meshing with a gear 55, which is secured upon the end of said shaft 20. A small sprocket wheel 56, is secured upon said shaft 40, and trained thereabout and about the sprocket wheel 53, is a chain 57, which serves to effect a drive from the shaft 40, to said shaft 52, and thence to the shaft 20, to drive the elevating chain 26. As clearly shown in Figs. 5, 6 and 7, vertical longitudinally disposed ribs 58, are secured rigidly on the inner surface of the respective cylindrical elements 11 and 12, against which the carcasses contact in their movement through the mechanism to assist in dehairing the same. Within said cylindrical elements 11 and 12, secured upon the vertical shafts 37 and 38, respectively, are flexible beater arms 59, composed of heavy ply fabric or leather, having scraper blades 60, on the outer ends thereof. For the purpose of insuring positive movement of the gambrel hooks around the track 10, and the carcasses therewith within the cylindrical elements, disks 61 and 62, are journaled upon said respective shafts 37 and 38, and supported at the upper end thereof on collars 63, secured on said shafts beneath said disks, and each of said disks has a series of notches 64, in the periphery thereof for engagement with a gambrel chain, as clearly shown in Fig. 3. Connected to said disk 61, and also mounted upon said shaft 37, is a large bevel gear 65, which, as shown in Fig. 3, receives its drive from a small bevel pinion 66, secured on a shaft 67, which is journaled in a bearing bracket supported beneath the crossbeams 5 and 6. Rigidly secured upon said shaft 67, intermediate the ends thereof, is a worm gear 68, which meshes with a worm 69, secured upon a shaft 70, mounted in bearings 71 and 72, secured upon the crossbeams 5 and 6. Said shaft 70, receives its drive from the main shaft 40, by means of a chain 73, trained about a sprocket wheel 74, secured on said shaft 70, and another sprocket wheel 75, secured upon said shaft 40. The drive for the disk 62, is received from the associated disk 61, and gear 65, there being a sprocket wheel 76, formed on the hub of the gear 65, about which is trained a chain 77, which is also trained around another sprocket wheel 78, journaled on a stud shaft depending from the under surface of the cross frame member 39. Rigidly associated with said sprocket wheel 78, is a gear 79, which meshes with another gear 80, secured on a long sleeve 81, which is journaled upon the shaft 38, and at its lower end is rigidly connected to the disk 62.

As shown in Fig. 1, inclined floor or partition members 82 and 83, are disposed beneath the cylindrical members and act to direct the hair and refuse falling thereon which have been removed from the carcasses, onto a belt conveyer 84. Said conveyer is trained over rollers which are mounted on shafts 85 and 86, of which the shaft 85, is adjustably mounted to enable proper tension to be secured on the conveyer belt. A gear 87, is secured on the shaft 86, and is driven by a pinion 88, secured on the same shaft with a sprocket wheel 89, which is driven from a sprocket wheel 90, on the shaft 67, by a chain 91. A tank 92, is mounted beneath said conveyer to receive the water draining therefrom which may have been used within the cylindrical members in washing the carcasses during dehairing of the same.

The operation is as follows: The carcasses to be dehaired receive a gambrel hook 29, attached on one leg thereof while in the scalding tank 18, and the roller on the gambrel hook is then engaged over one of the hooks 27, on the elevator chain 26, which lifts the hog out of the scalding tank and carries the same upwardly. When a certain point is reached a roller 32, on said chain strikes the arm 31, of a bell crank, impelling the other arm 33, thereof against the roller 30, of the gambrel hook to disengage the same from the chain hook 27, thrusting said roller into the track 10, which inclines downwardly so that the carcass travels by gravity into the field of operation of the beaters within the first cylindrical shell member 11. As the carcass travels inwardly suspended from its gambrel hook, the notched revolving disk 61, engages the gambrel to thrust the same around the track 10, thus causing the carcass to roll against the vertical ribs 58, on the walls of the cylindrical element while subjected to the beating action of the rapidly rotating beaters 59—60, finally discharging the same at the other side of the shell and into another similar cylindrical shell element 12, where another disk 62, engages the gambrel chain, and acts to thrust the same and the suspended carcass thereon around the track member subjected to the action of beater and scraper mechanisms, the carcass finally passing outwardly thoroughly cleaned and dehaired.

All of the various mechanisms are driven from the main shaft 40, and the gear ratio is such that proper synchronous operation of the parts is assured at all times.

I am aware that various details of construction may be varied through a wide range without departing from the principles of this invention, and I therefore do not purpose limiting the patent granted otherwise than necessitated by the prior art.

I claim as my invention:

1. In a device of the class described, upright cylindrical elements, a track formed around the interior thereof to carry the carcass therethrough, beating mechanisms operating on the carcass in its passage, and means positively moving the carcass around on said track on the interior of said elements.

2. In a device of the class described, upright cylindrical elements, beating mechanisms therein, a track disposed around the inner walls of said elements to carry the carcass therethrough, and means within said elements to move the carcass around within said elements in the field of operation of said beating mechanisms.

3. In a device of the class described, upright cylindrical elements, a track disposed around within the same to carry the carcass therethrough, dehairing mechanisms within said elements, means for elevating said carcass to said track, and means for transferring the said carcass to said track for movement through the field of operation of the dehairing mechanism in said elements.

4. In a device of the class described, a tortuous track for carrying the carcass through the device, beating mechanism disposed therebelow, a support in the carcass adapted to engage said track, means elevating the carcass and transferring the same to said track, and mechanism positively engaging the carcass support to move the same on said track through the field of operation of said beating mechanism.

5. In a device of the class described, upright elements, scraper bars secured vertically on the inner walls thereof, revolving beater mechanisms mounted centrally therewithin, and mechanism for conveying a carcass therethrough in the field of operation of said beater mechanisms and in contact with said scraper bars.

6. In a device of the class described, a tortuous track, a plurality of beater mechanisms therebeneath, and mechanism positively moving a carcass suspended from said track through the field of operation of said beater mechanisms.

7. In a device of the class described, upright cylindrical elements, each open along one side with the open sides thereof directed toward one another, a track disposed around the interior of said elements for carrying the carcass around one cylindrical element and outwardly therefrom into and around the other cylindrical element, beating mechanisms mounted within each of said cylindrical elements, and operating on the carcass as the same moves around on said track, and means associated with said beating mechanisms for positively moving the carcass around on said track.

8. In a device of the class described, upright cylindrical elements, a track disposed around within the same leading from one element into the other, a vertical shaft within each of said cylindrical elements, dehairing mechanisms mounted thereon, means for driving said shafts to rotate said dehairing mechanisms within said elements, means adapted to be connected to the legs of a carcass to hold the same suspended, a roller on each of said means to move in said track to carry the carcass through said cylindrical elements subjected to the action of said dehairing mechanisms, and means for positively moving said suspending means around on said track through said cylindrical elements.

9. In a device of the class described, upright curved elements, a track disposed around the upper ends thereof for carrying the carcass through said elements from one into the other, means for elevating said carcass to said track, mechanism for effecting a transfer of the carcass from said elevating means to said track for movement on said track through said elements, and means within said elements to operate on the carcass to dehair the same as it moves through said elements.

10. In a device of the class described, a frame, curved upright elements mounted therein, a curved track disposed at the upper end of said elements leading into and around one thereof and from the same into the other of said elements and around the latter and outwardly therefrom, supporting means to suspend a carcass therefrom adapted to move on said track into and through said elements carrying the carcass therewith, rotatable beaters mounted within said elements to operate on the carcass carried therethrough, and mechanism for positively moving said means on said track to convey the carcass through said elements subjected to the action of the beaters.

11. In a device of the class described, a frame, upright curved elements mounted therein opening toward one another, a curved supporting device leading into and around and between said respective elements, roller mechanisms adapted to move thereon through said elements carrying a carcass suspended therefrom, power driven beater mechanisms mounted within said elements to operate on the carcasses carried therethrough, and means associated with said beater elements for coaction with said mechanisms positively to move the same along to convey the carcasses through said upright elements.

12. In a device of the class described, a frame, upright elements mounted thereon, beater mechanisms mounted within said elements, a curved track leading into and through said elements and outwardly therefrom, carcass supporting means, rollers thereon to move in said track through said elements with the carcass positioned for action thereupon by said beaters as the carcass is conveyed through said elements, and a conveying means for engagement with said supporting means to elevate the same to said track and to release the same thereon for movement through said elements.

13. In a device of the class described, a frame, curved upright elements mounted thereon, a curved track disposed at the upper end of said elements, vertical shafts mounted axially within said elements, beaters thereon, scraper bars on the interior surface of said elements, mechanism adapted to move on said track to support a carcass suspended therefrom, conveying the same through said elements in the field of action of said scrapers and said beaters, means associated with said beaters to coact with said mechanism positively to move the same along on said track, and gears at the upper ends of said vertical shafts to impart a drive thereto.

14. In a device of the class described, upright elements, a track at the upper end thereof, carcass supporting means, rollers on said means to move on said track to convey a carcass through said elements, beater mechanisms adapted to be driven and disposed within said elements to operate on carcasses passed through said elements, a conveying mechanism constructed for engagement with said supporting means to elevate the same and the carcasses suspended therefrom to said track, mechanisms effecting disengagement of the supporting means from the conveying mechanisms to transfer the carcass to said track, and mechanism driving said conveyer and said beater mechanisms.

In testimony whereof I have hereunto subscribed my name in the presence of two subscribing witnesses.

ARTHUR E. OZOUF.

Witnesses:
CHARLES W. HILLS, Jr.,
EARL M. HARDINE.

Copies of this patent may be obtained for five cents each, by addressing the "Commissioner of Patents, Washington, D. C."